J. M. SHARP.
COMBINED LAMP AND LICENSE HOLDER FOR AUTOMOBILES.
APPLICATION FILED JUNE 15, 1908.

903,014.

Patented Nov. 3, 1908.

Witnesses
Samuel Payne
K. H. Butler

Inventor
J. M. Sharp,
By H. C. Everett
Attorneys

UNITED STATES PATENT OFFICE.

JOSEPH M. SHARP, OF SEWICKLEY, PENNSYLVANIA.

COMBINED LAMP AND LICENSE HOLDER FOR AUTOMOBILES.

No. 903,014.　　　Specification of Letters Patent.　　　Patented Nov. 3, 1908.

Application filed June 15, 1908.　Serial No. 438,543.

*To all whom it may concern:*

Be it known that I, JOSEPH M. SHARP, a citizen of the United States of America, residing at Sewickley, in the county of Allegheny and State of Pennsylvania, have invented certain new and useful Improvements in a Combined Lamp and License Holder for Automobiles, of which the following is a specification, reference being had therein to the accompanying drawing.

This invention relates to a combined lamp and license holder for automobiles and similar vehicles, and the primary object of my invention is to provide a holder for detachably supporting a lamp and license plate upon the rear end of an automobile with the lamp in close proximity to the license plate, whereby said lamp will illuminate the license plate and permit of the same being easily read.

A further object of my invention is to provide a holder having an adjustable license plate retainer, the retainer in conjunction with brackets being designed to support plates of various sizes.

With the above and other objects in view the invention consists in the novel construction, combination and arrangement of parts to be presently described and then specifically pointed out in the appended claims.

Figure 1:
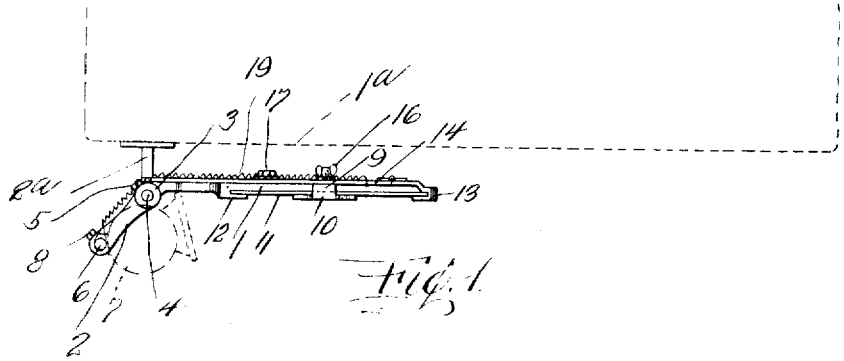
Figure 2:
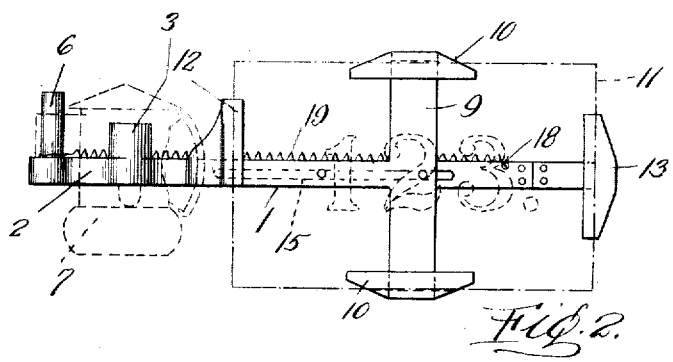
Figure 3:
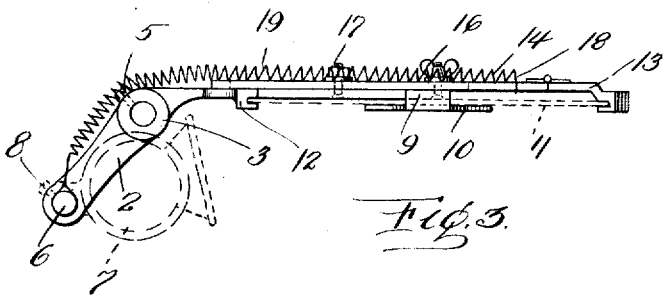

In the drawings:—Figure 1 is a plan of my holder as supported from the rear end of an automobile. Fig. 2 is a front elevation of the detached holder upon a larger scale than that illustrated in Fig. 1, and Fig. 3 is a plan of the same.

In the accompanying drawings, 1ª designates the rear end of an automobile or similar vehicle provided with a bracket 2ª for supporting my combined lamp and license plate holder.

The holder comprises a bar 1 having an angular extension 2 provided with a socket 3 for a pin 4 of the bracket 2ª, said socket being retained in engagement with the pin 4 by a set screw 5. The angular end of the bar 1 is also provided with an upright pin 6 for supporting a lamp 7 of any desired form, said lamp being held in engagement with the pin 6 by a set screw 8.

The opposite end of the bar 1 is provided with a cross head 9 having parallel brackets 10 for supporting the upper and lower edges of a license plate 11. The bar 1 intermediate the socket 3 and the cross head 9 is provided with a vertical bracket 12 for supporting one end of the license plate 11, while the opposite end thereof is supported by a hinged bracket or retainer 13 carried by a retainer bar 14. The retainer bar 14 is provided with a longitudinal slot 15 through which extends a set screw 16 for fixing the bar 14 with relation to the bar 1. The bar 1 is provided with a bolt 17 for guiding the bar 14 upon the bar 1.

Attached to the outer end of the bar 14, as at 18, is a retractile spring 19, said spring extending in the rear of the socket 3 and connecting with the pin 6.

After the license plate 11 has been placed in engagement with the parallel brackets 10 and the vertical bracket 12, the retainer or bracket 13 is swung into position and then the bar 14 adjusted to lock the license plate in the position illustrated in Figs. 2 and 3 of the drawings. The hinged retainer or bracket 13 permits of the license plate being easily removed when it is desired to replace the plate by another, as would be necessary when traveling through different States.

The holder is constructed of light and durable metal, and while I have illustrated the preferred embodiments of my invention, I would have it understood that the elements therein can be varied or changed without departing from the spirit of the invention.

Having now described my invention what I claim as new, is:—

1. A holder of the type described comprising a bar having an angular end provided with a socket, an upright pin carried by the angular end of said bar, a cross head carried by the opposite end thereof, parallel brackets carried by said cross head, a vertical bracket carried by said bar, a slotted bar adjustably connected to the first mentioned bar, a hinged bracket carried by one end thereof, a retractile spring attached to said slotted bar and extending in the rear of said socket and connecting with said upright pin.

2. A combined lamp and license plate holder comprising a bar having an angular end, a lamp supporting pin carried by the angular end of said bar, brackets supported by the opposite end of said bar, a bar movably mounted upon the first mentioned bar, a hinged bracket carried by one end of said movable bar for retaining a license plate in engagement with the other of said brackets, and a retractile spring connecting with said movable bar and with said lamp supporting pin for normally holding said hinged bracket in engagement with the license plate.

3. A holder of the type described comprising in combination a suitable support, a bar pivotally connected to said support and provided at one end with an angular extension, means carried by said extension for supporting a lamp, a cross head carried by said bar intermediate its ends and provided with spaced parallel brackets, a retainer bar adjustably connected to the first mentioned bar, and a bracket hinged to the outer end of said retainer bar, substantially as described.

4. In a holder of the type described, a bar, lamp supporting means carried by said bar, a plurality of license plate holders carried by the bar, a retainer bar adjustably connected to the first mentioned bar, and a bracket hinged to said retainer bar and also adapted for engagement with said license plate.

In testimony whereof I affix my signature in the presence of two witnesses.

JOSEPH M. SHARP.

Witnesses:
MAX H. SROLOVITZ,
K. H. BUTLER.